(12) United States Patent
Gharaibeh et al.

(10) Patent No.: US 11,968,344 B2
(45) Date of Patent: Apr. 23, 2024

(54) SEMI-TRANSPARENT EMBEDDED WATERMARKS

(71) Applicant: Google LLC, Mountain View, CA (US)

(72) Inventors: Abdullah Hassan Gharaibeh, Kitchener (CA); Michal Dabrowski, Warsaw (PL); Ryan Matthew Haggarty, Kitchener (CA); Igor Foox-Rapoport, Kitchener (CA); Wan Wang, Bellevue, WA (US); Duncan Geoffrey Hector Wood, New York, NY (US); Dany Kuminov, Kitchener (CA); Matthew Young-Lai, Kitchener (CA); Bhavin Vyas, Milpitas, CA (US); George Jacob Levitte, New York, NY (US); Jean Semere, Paris (FR)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 17/727,257

(22) Filed: Apr. 22, 2022

(65) Prior Publication Data
US 2022/0247884 A1    Aug. 4, 2022

Related U.S. Application Data

(63) Continuation of application No. 16/840,909, filed on Apr. 6, 2020, now Pat. No. 11,343,402, which is a
(Continued)

(30) Foreign Application Priority Data
Mar. 14, 2017  (IL) .......................... 251149

(51) Int. Cl.
H04N 1/32  (2006.01)
G06F 21/16  (2013.01)
(Continued)

(52) U.S. Cl.
CPC ......... *H04N 1/32331* (2013.01); *G06F 21/16* (2013.01); *G06T 1/0021* (2013.01);
(Continued)

(58) Field of Classification Search
CPC ............. H04N 1/32331; H04N 19/423; H04N 1/32203; H04N 1/32208; H04N 1/32229;
(Continued)

(56) References Cited

U.S. PATENT DOCUMENTS 5,825,892 A  10/1998  Braudaway et al.
6,614,914 B1   9/2003  Rhoads et al.
(Continued)

FOREIGN PATENT DOCUMENTS

CN    1637775    7/2005
CN   106372467   2/2017
(Continued)

OTHER PUBLICATIONS

Office Action in Chinese Appln. No. 201780047786.4, dated Dec. 1, 2022, 25 pages (with English translation).
(Continued)

*Primary Examiner* — Kevin Ky
(74) *Attorney, Agent, or Firm* — Fish & Richardson P.C.

(57) ABSTRACT

A watermark image may be generated that includes a first set of encoded pixels each of which is assigned a first transparency value and a second set of encoded pixels each of which is assigned a second transparency value, the second transparency level being different from the first transparency level. The encoded pixels may be distributed among a set of blank pixels such that each encoded pixel neighbors one or more blank pixels in the watermark image, and in particular at least two blank pixels in the watermark image. Herein, each blank pixel may be assigned the second transparency value. The watermark image may be overlaid and blended
(Continued)

over a background source image to create an encoded source image. A decoder system may recover encoded information from the encoded source image.

20 Claims, 10 Drawing Sheets

Related U.S. Application Data continuation of application No. 15/712,395, filed on Sep. 22, 2017, now Pat. No. 10,616,439.

(51) Int. Cl.
| | |
|---|---|
| *G06T 1/00* | (2006.01) |
| *H04N 19/423* | (2014.01) |
| *H04N 21/426* | (2011.01) |
| *H04N 21/8358* | (2011.01) |

(52) U.S. Cl.
CPC ....... *G06T 1/0028* (2013.01); *H04N 1/32203* (2013.01); *H04N 1/32208* (2013.01); *H04N 1/32229* (2013.01); *H04N 1/32251* (2013.01); *H04N 1/32293* (2013.01); *H04N 1/32309* (2013.01); *H04N 19/423* (2014.11); *H04N 21/42684* (2013.01); *H04N 21/8358* (2013.01); *G06T 2201/0051* (2013.01); *G06T 2201/0083* (2013.01); *H04N 2201/3233* (2013.01)

(58) Field of Classification Search
CPC ........... H04N 1/32251; H04N 1/32293; H04N 1/32309; H04N 21/42684; H04N 21/8358; G06F 21/16; G06T 1/0021; G06T 1/0028

See application file for complete search history.

(56) References Cited

U.S. PATENT DOCUMENTS

| | | | |
|---|---|---|---|
| 6,704,024 B2 | 3/2004 | Robotham et al. | |
| 7,187,780 B2 | 3/2007 | Tian et al. | |
| 8,526,666 B1* | 9/2013 | Hadden | G06F 21/10 |
| | | | 345/592 |
| 9,009,826 B1 | 4/2015 | Sripracha | |
| 10,102,648 B1 | 10/2018 | Vannier et al. | |
| 2002/0090110 A1 | 7/2002 | Braudaway et al. | |
| 2003/0133591 A1* | 7/2003 | Watanabe | G06T 1/0028 |
| | | | 382/232 |
| 2004/0013284 A1 | 1/2004 | Yu | |
| 2004/0117427 A1* | 6/2004 | Allen | H04N 21/6543 |
| | | | 709/200 |
| 2004/0258274 A1* | 12/2004 | Brundage | G07D 7/207 |
| | | | 382/100 |
| 2005/0036651 A1* | 2/2005 | Wen | G06T 1/0028 |
| | | | 382/100 |
| 2006/0004630 A1 | 1/2006 | Criddle et al. | |
| 2008/0129758 A1* | 6/2008 | Fox | H04N 1/32144 |
| | | | 382/307 |
| 2009/0060261 A1 | 3/2009 | Wang | |
| 2010/0115282 A1 | 5/2010 | Amsterdam et al. | |
| 2010/0128290 A1* | 5/2010 | Fan | B42D 25/29 |
| | | | 358/1.9 |
| 2010/0128299 A1* | 5/2010 | Fan | H04N 1/32229 |
| | | | 358/1.14 |
| 2010/0215342 A1* | 8/2010 | Lee | H04N 5/913 |
| | | | 386/E5.003 |
| 2011/0075200 A1* | 3/2011 | Goldwater | H04N 1/00307 |
| | | | 358/1.18 |
| 2012/0063678 A1 | 3/2012 | Asikainen | |
| 2013/0097426 A1 | 4/2013 | Agrawal et al. | |
| 2013/0120369 A1* | 5/2013 | Miller | G06T 19/20 |
| | | | 345/419 |
| 2013/0128120 A1* | 5/2013 | Chanda | H04N 21/8146 |
| | | | 348/600 |
| 2013/0145446 A1* | 6/2013 | Dorso | G06F 21/36 |
| | | | 726/6 |
| 2014/0020017 A1* | 1/2014 | Stern | H04N 21/2747 |
| | | | 725/34 |
| 2014/0086408 A1 | 3/2014 | Bickmore et al. | |
| 2014/0270331 A1 | 9/2014 | Zhao | |
| 2016/0034231 A1* | 2/2016 | Miyake | G06K 15/1889 |
| | | | 358/3.28 |
| 2017/0220911 A1 | 8/2017 | Panek | |
| 2017/0243041 A1 | 8/2017 | Arce et al. | |
| 2018/0018024 A1 | 1/2018 | Park | |
| 2018/0270388 A1 | 9/2018 | Gharaibeh et al. | |
| 2022/0247884 A1* | 8/2022 | Gharaibeh | H04N 1/32331 |
| 2023/0022018 A1* | 1/2023 | Spaulding | H04N 21/44222 |
| 2023/0287524 A1* | 9/2023 | Dai | C12Q 1/6851 |

FOREIGN PATENT DOCUMENTS

| | | |
|---|---|---|
| EP | 2453389 | 5/2012 |
| WO | WO 98/36571 | 8/1998 |

OTHER PUBLICATIONS

Dwuser.com [online], "The Basics of Overlaying Content," Rohler, Last Update Date: Unknown [retrieved on Sep. 21, 2017] Retrieved from URL <http://www.dwuser.com/education/content/the-basics-of-overlaying-content/>, 5 pages.

International Preliminary Report on Patentability, issued in International Appln. No. PCT/US2017/052860, dated Sep. 26, 2019, 9 pages.

International Search Report and Written Opinion issued in International Appln. No. PCT/US2017/052860, dated Nov. 16, 2017, 15 pages.

Office Action in European Appln. No. 17783623.6, dated Feb. 26, 2021, 9 pages.

Office Action in Indian Appln. No. 201927025022, dated Feb. 2, 2021, 15 pages (with English translation).

Permadi.com [online], "Embeding Watermark Using CSS," 2014 [retrieved on Sep. 21, 2017] retrieved from URL<https://permadi.com/tutorial/cssEmbedLogo/>, 11 pages.

Saraju et al., "Digital watermarking: A tutorial review," Dept of Computer Science and Engineering, University of South Florida, Jan. 1999, 23 pages.

Uconomix.com [online], "Add a QR code on photos," 2016 [retrieved on Sep. 21, 2017] retrieved from URL<https://www.uconomix.com/Products/uMark/Blog/qr-code-watermark>, 4 pages.

Notice of Allowance in Chinese Appln. No. 201780047786.4, dated Mar. 23, 2023, 5 pages (with English translation).

Office Action in European Appln. No. 17783623.6, dated Mar. 22, 2023, 4 pages.

\* cited by examiner

308

|   | 1 | 2 | 3 | 4 | 5 | 6 |
|---|---|---|---|---|---|---|
| 1 | ($B_{RGB}$, 0) | ($B_{RGB}$, 0) | ($B_{RGB}$, 0) | ($B_{RGB}$, 0) | ($B_{RGB}$, 0) | ($B_{RGB}$, 0) |
| 2 | ($B_{RGB}$, 0) | ($B_{RGB}$, 0) | ($B_{RGB}$, 0) | ($B_{RGB}$, 0) | ($B_{RGB}$, 0) | ($B_{RGB}$, 0) |
| 3 | ($B_{RGB}$, 0) | ($B_{RGB}$, 0) | ($B_{RGB}$, 0) | ($B_{RGB}$, 0) | ($B_{RGB}$, 0) | ($B_{RGB}$, 0) |

|   | 1 | 2 | 3 | 4 | 5 | 6 |
|---|---|---|---|---|---|---|
| 1 | ($B_{RGB}$, $B_a$) | ($B_{RGB}$, 0) | ($B_{RGB}$, 0) | ($B_{RGB}$, 0) | ($B_{RGB}$, $B_a$) | ($B_{RGB}$, 0) |
| 2 | ($B_{RGB}$, 0) | ($B_{RGB}$, $B_a$) | ($B_{RGB}$, 0) | ($B_{RGB}$, $B_a$) | ($B_{RGB}$, 0) | ($B_{RGB}$, $B_a$) |
| 3 | ($B_{RGB}$, 0) | ($B_{RGB}$, 0) | ($B_{RGB}$, $B_a$) | ($B_{RGB}$, 0) | ($B_{RGB}$, 0) | ($B_{RGB}$, 0) |

|   | 1 | 2 | 3 | 4 | 5 | 6 |
|---|---|---|---|---|---|---|
| 1 | $C1_{RGB}$ | $C2_{RGB}$ | $C3_{RGB}$ | $C4_{RGB}$ | $C5_{RGB}$ | $C6_{RGB}$ |
| 2 | $C7_{RGB}$ | $C8_{RGB}$ | $C9_{RGB}$ | $C10_{RGB}$ | $C11_{RGB}$ | $C12_{RGB}$ |
| 3 | $C13_{RGB}$ | $C14_{RGB}$ | $C15_{RGB}$ | $C16_{RGB}$ | $C17_{RGB}$ | $C18_{RGB}$ |

|   | 1 | 2 | 3 | 4 | 5 | 6 |
|---|---|---|---|---|---|---|
| 1 | $C1_{RGB} \times (1-B_a)$ | $C2_{RGB}$ | $C3_{RGB}$ | $C4_{RGB}$ | $C5_{RGB} \times (1-B_a)$ | $C6_{RGB}$ |
| 2 | $C7_{RGB}$ | $C8_{RGB} \times (1-B_a)$ | $C9_{RGB}$ | $C10_{RGB} \times (1-B_a)$ | $C11_{RGB}$ | $C12_{RGB} \times (1-B_a)$ |
| 3 | $C13_{RGB}$ | $C14_{RGB}$ | $C15_{RGB} \times (1-B_a)$ | $C16_{RGB}$ | $C17_{RGB}$ | $C18_{RGB}$ |

FIG. 3G

316
FIG. 3H
318
| | 1 | 2 | 3 | 4 | 5 | 6 |
|---|---|---|---|---|---|---|
| 1 | ■ | □ | □ | □ | ■ | □ |
| 2 | □ | ■ | □ | ■ | □ | ■ |
| 3 | □ | □ | ■ | □ | □ | □ |
FIG. 3I
320
FIG. 3J

SEMI-TRANSPARENT EMBEDDED WATERMARKS

CROSS-REFERENCE TO RELATED APPLICATIONS

This application is a continuation of and claims priority to U.S. application Ser. No. 16/840,909, filed on Apr. 6, 2020, which is a continuation of and claims priority to U.S. application Ser. No. 15/712,395, now U.S. Pat. No. 10,616,439, filed on Sep. 22, 2017, which claims priority to Israel Application Serial No. 251149, filed on Mar. 14, 2017. The entire contents of each of the foregoing applications are incorporated herein by reference.

BACKGROUND

This specification generally relates to techniques for generating and recovering watermark images. The watermark images are used to modify unknown source images, e.g., source images that are presented as third-party content in electronic documents.

In a networked environment, such as the Internet or other networks, first-party content providers can provide information for presentation in electronic documents, for example web pages or application interfaces. The documents can include first-party content provided by first-party content providers and third-party content provided by third-party content providers.

Third-party content can be added to an electronic document using various techniques. Some documents include tags that instruct a client computer on which the document is presented to request third-party content items directly from third-party content providers. Other documents include tags that instruct the client computer to call an intermediary service that partners with multiple third-party content providers to return third-party content items selected from one or more of the third-party content providers. In some instances, third-party content items are dynamically selected for presentation in electronic documents, and the particular third-party content items selected for a given serving of a document may differ from third-party content items selected for other servings of the same document.

SUMMARY

This specification describes systems, methods, devices, and other techniques for generating watermark images to supplement source images that are displayed, for example, as third-party content in an electronic document. In other aspects, this specification describes systems, methods, devices, and other techniques for recovering information encoded in an encoded source image that shows a semi-transparent watermark overlaid on a source image. In some implementations, a system uses information recovered from an encoded source image to identify a provider of the source image, other characteristics of the source image, or context about a specific impression of the source image.

The semi-transparent watermark image may be generated by a watermark image generator including one or more processors. The watermark image may include a first set of encoded pixels each of which is assigned a first transparency value and a second set of encoded pixels each of which is assigned a second transparency value, the second transparency level being different from the first transparency level. The encoded pixels may be distributed among a set of blank pixels such that each encoded pixel neighbors one or more blank pixels in the watermark image, and in particular at least two blank pixels in the watermark image. Herein, each blank pixel may be assigned the second transparency value. More specifically, assigning the first transparency value to first pixels in the watermark image may comprise setting a transparency level of the first pixels in the watermark image to be less than 100-percent transparent and assigning the second transparency value to second pixels in the watermark image may comprise setting a transparency level of the second pixels in the watermark image to a 100-percent transparency.

The watermark image generator may generate the watermark image by spacing the set of encoded pixels among a set of blank pixels such that each encoded pixel in the watermark image neighbors one or more blank pixels in the watermark image, an in particular at least two blank pixels in the watermark image. According to one embodiment, distributing the encoded pixels among the set of blank pixels may comprise (i) creating an initial watermark canvas that has m rows of pixels and n columns of pixels, wherein each pixel in the initial watermark canvas is a blank pixel; and (ii) for every $k^{th}$ row in the initial watermark canvas, mapping the pixels from a corresponding row of the encoding image to every $l^{th}$ pixel in the respective row of the initial watermark canvas. For example, if the encoding image has i rows of pixels and j columns of pixels, distributing the encoded pixels among the set of blank pixels may comprise (i) creating an initial watermark canvas that has i rows of pixels and $2_j$ columns of pixels, wherein each pixel in the initial watermark canvas is a blank pixel; (ii) for every second row in the initial watermark canvas, mapping the pixels from a corresponding row of the encoding image to every second pixel in the row of the initial watermark canvas; and (iii) for every other row in the initial watermark canvas, mapping the pixels from a corresponding row of the encoding image to every second pixel in the row of the initial watermark canvas and shifting the pixels by one column in the initial watermark canvas.

In order to recover such watermark image from an encoded source image, a system of one or more computers may select a portion of the encoded source image having a size that matches a size of the watermark image and may then determine, for each encoded pixel in the watermark image, a binary value of the encoded pixel based on a comparison of a value of a corresponding pixel in the selected portion of the encoded source image with respect to values of one or more other pixels in the selected portion of the encoded source image, and in particular with respect to values of at least two other pixels in the selected portion of the encoded source image. The one or more other pixels may be neighboring pixels of the encoded pixel for which a binary value is to be determined. Here, a neighboring pixel is generally any pixel that is adjacent to the encoded pixel, e.g., directly above, below, or to the left or right of the encoded pixel. In general, the comparison may also take into account next-nearest neighbors of the encoded pixel or other pixels in a specified surrounding of the encoded pixel.

For each pixel in the encoded source image which corresponds to an encoded pixel in the watermark image, determining a binary value of the encoded pixel may comprise determining whether a color of the corresponding pixel in the encoded source image matches a color of at least a threshold number of neighboring pixels for the corresponding pixel. For example, if a color of a first encoded pixel in the encoded source image matches the color of at least the threshold number of neighboring pixels for the first encoded pixel, then, in response, a first binary value may be assigned to the first pixel in the recovered image of the watermark, and if a color of a second encoded pixel in the encoded source image does not match the color of at least the threshold number of neighboring pixels for the second encoded pixel, then, in response, a second binary value may be assigned to the second pixel in the recovered image of the watermark.

Some implementations of the subject matter described herein can, in certain instances, realize one or more of the following advantages. First, a system may generate a watermark image to augment an arbitrary source image, even if the source image is not known when the watermark image is created. Because the watermark image may be overlaid on the source image for presentation to a user at a client computer remote from the system, the system need not directly obtain or modify the source image before the watermark image is transmitted to a client computer. Second, the system may recover a watermark image, or may recover an encoding image from which the watermark image was derived, even without a priori knowledge of the source image, thereby enabling a system to decode arbitrary images without knowing where they originated from. Third, the watermark image can be substantially transparent so as to be imperceptible to users when the watermark image is rendered over a source image so that the watermark image does not degrade the perceived visual quality of the source image. Fourth, the amount of time and computational expense required to generate a watermark image can be reduced by separating the watermark image from the source image over which the watermark image will be displayed. For example, rather than directly modifying a complex source image to add a watermark, which can take a significant amount of time and processing resources, the systems and techniques disclosed herein may generate the watermark image independently of the source image, which can be performed with fewer processing resources and/or in less time than modifying the source image. By relying on a separate client computer to blend the watermark image over the source image, the system can reduce latency in serving the watermark image responsive to a request from the client computer, while also reducing the number of computational cycles involved in responding to the request because the server system is not required to blend the watermark image and the source image prior to delivering the source image. Fifth, the system may generate binary watermark images, or other watermark images with relatively few color or transparency options, to maintain a compact file size that allows the images to be efficiently transmitted to a client computer over a network, whereas other watermark images may be much larger to accommodate.

DESCRIPTION OF DRAWINGS

FIGS. 3A-3J illustrate example techniques for generating a watermark image and recovering the watermark image, or a related image, from an encoded source image.

DETAILED DESCRIPTION

Figure 1:
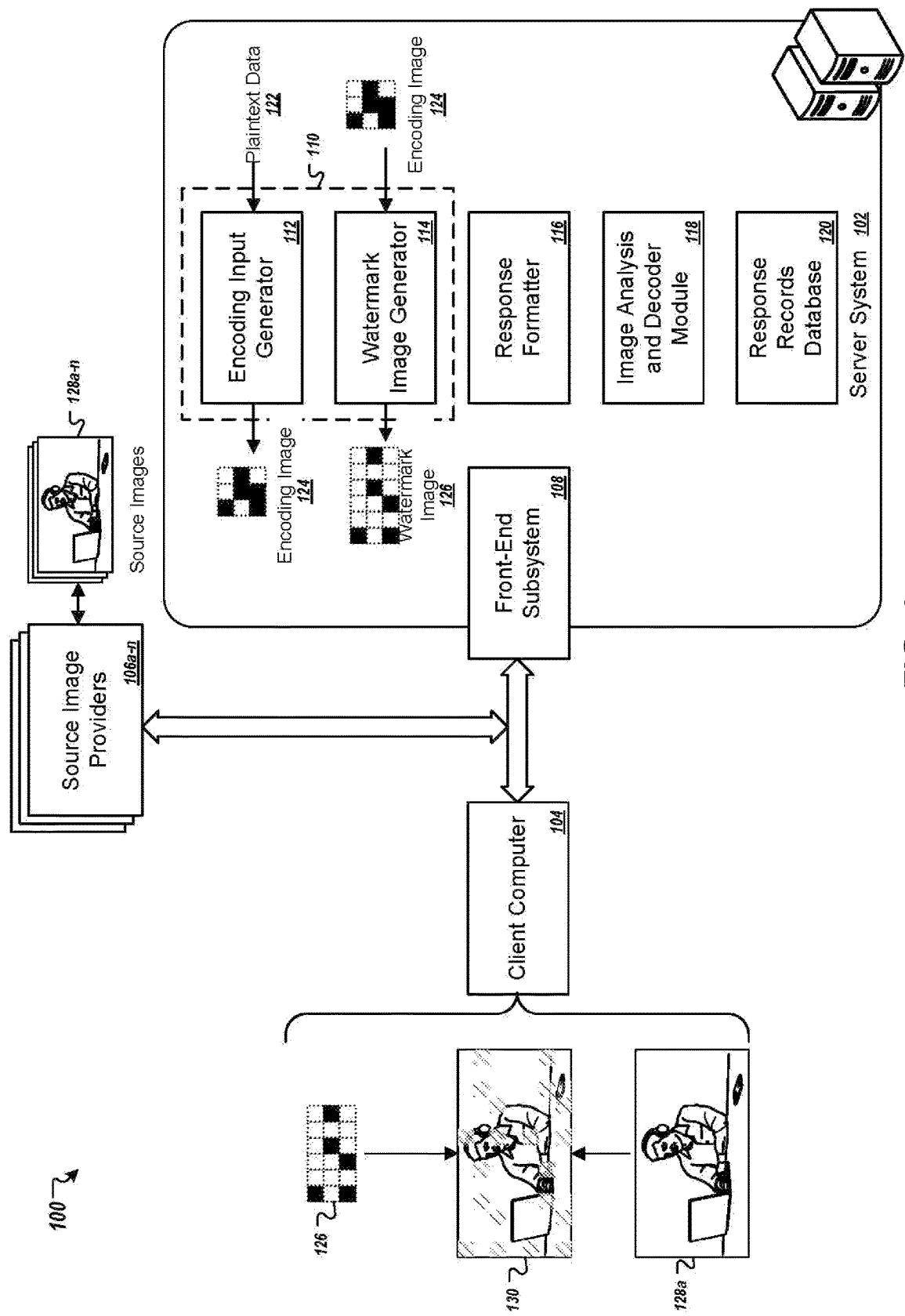
FIG. 1 depicts a block diagram of a networked environment that augments electronic documents served to a client computer with watermark images that are arranged for display over one or more source images presented in the documents.

FIG. 1 depicts a block diagram of a networked environment 100 that generates a watermark image for display over a source image presented in an electronic document served to a client computer 104. The environment 100 includes a server system 102, a client computer 104, and computing systems for one or more source image providers 106*a-n*. The server system 102, client computer 104, and source image providers 106*a-n* are connected over one or more networks such as the Internet or a local area network (LAN). In general, the client computer 104 is configured to generate and transmit requests for electronic documents to the server system 102. Based on the requests from the client computer 104, the server system 102 generates responses (e.g., electronic documents) to return to the client computer 104. A given response can include a selected source image 128*a* that is configured to be displayed to a user of the client computer 104, where the source image 128*a* is provided by one of the source image providers 106*a-n*. The server system 102 can augment the response served to the client computer 104 with a semi-transparent watermark image 126 that is arranged for display in a presentation of the response document at the client computer 104 over the source image 128.

The client computer 104 can be any type of computing device that presents images and other content to one or more human users. The client computer 104 may include an application, such as a web browser application, that makes requests to and receives responses from the server system 102. The application may execute a response from the server system 102, such as web page code or other types of document files, to present the response to the one or more users of the client computer 104. In some implementations, the client computer 104 includes an electronic display device (e.g., an LCD or LED screen, a CRT monitor, a head-mounted virtual reality display, a head-mounted mixed-reality display), or is coupled to an electronic display device, that displays content from the rendered response to the one or more users of the client computer 104. The displayed content can include the selected source image 128*a* and the watermark image 126 displayed over top of the selected source image 128*a* in a substantially transparent manner. In some implementations, the client computer 104 is a notebook computer, a smartphone, a tablet computer, a desktop computer, or a smartwatch or other wearable device.

In some implementations, the source image 128 provided in the response to the client computer 104 is a third-party content item that, for example, is not among content provided by a first-party content provider of the response. For example, if the response is a web page, the creator of the web page may include a slot that is configured to be populated by a source image from a third-party content provider that differs from the creator of the web page (e.g., a provider of an image repository). In another example, the first-party content provider may directly link to a third-party source image 128. The client computer 104 may request the source image 128 directly from a corresponding computing system for one of the source image providers 106a-n or indirectly via an intermediary service, such as a service provided by server system 102 or another server system.

The server system 102 is configured to respond to a request from the client computer 104 with an electronic document and a semi-transparent watermark image 126 that is to be displayed in the electronic document over a source image 128a. The server system 102 can be implemented as one or more computers in one or more locations. The server system 102 can include one or more of a front-end subsystem 108, an image generation subsystem 110, a response formatter 116, an image analysis and decoder module 118, and a response records database 120. Each of the components 108-120 is configured to perform the respective operations described herein. For example, the operations associated with each component 108-120 may be defined by instructions stored in memory on one or more computer-readable storage devices, and the operations may be carried out when the instructions are executed by one or more processors of the server system 102. Although some operations are described herein as being performed by a specific one of the components 108-120 by way of example, in other implementations, some or all of the operations of two or more of the components 108-120 may be consolidated and performed instead by a single component. In yet other implementations, the operations of any one of the components 108-120 may be divided among two or more components.

The server system 102 can be configured to carry out the techniques illustrated in FIGS. 3A-3I and the processes 400, 500, and 700. The operations of processes 400, 500, and 700, and other techniques, are described in further detail below with respect to FIGS. 3A-3I, 4, 5, and 7. An overview of the server system 102 and its components 108-120 follows below, with further detail of the operations and other techniques performed by these components described subsequently with respect to FIGS. 3A-3I and FIGS. 4, 5, and 7.

The front-end subsystem 108 provides an interface for communicating over one or more networks. The front-end subsystem 108 receives requests from the client computer 104 and transmits responses to the requests, along with any content associated with the requests such as a watermark image and, optionally, a source image, to the client computer 104. The front-end subsystem 108 may also communicate with the computing systems of source image providers 106a-n, e.g., to obtain a source image 128a to serve to the client computer 104. The front-end subsystem 108 may also communicate with, and include a controller for coordinating activities among, each of the components 112-120 of the server system 102. To facilitate communication with devices over a network, the front-end system can include a wired (e.g., metallic or optical), wireless, or combination of wired and wireless communications interfaces that enable the front-end subsystem to connect to an active communications network.

The image generation subsystem 110 is configured to generate images from input data. In particular, the image generation subsystem 110 includes an encoding input generator 112 and a watermark image generator 114.

The encoding input generator 112 processes a plaintext data item 122 to generate an encoding image 124 that encodes the plaintext data item 122. The plaintext data item 122 can be any data that is capable of being encoded within the constraints of the encoding input generator 112. For example, the plaintext data item 122 may be a text sample with a maximum length of n characters, since the size of the encoding image 124 may be capable of providing lossless encoding for text samples only up to the pre-defined maximum length of n characters. In some implementations, the plaintext data item 122 is a session identifier that uniquely identifies a network session between the client computer 104 and the server system 102 during which a response is served to a request from the client computer 104.

In some implementations, the plaintext data item 122 includes or references source image data that identifies the particular source image 128a served to the client computer 104 or information associated with the source image 128a (e.g., information that indicates which of the source image providers 106a-n provided the particular source image 128a served to the client computer 104). In some implementations, the response records database 120 stores data that associates detailed information about a response served for a particular request, in order to make the detailed information accessible via the session identifier represented by the plaintext data item 122. The response records database 120 can also associate a session identifier with source image data, thereby making the source image data accessible by querying the database 120 using the session identifier represented by the plaintext data item 122. A user can then identify, for example, which of the source images 128a-n was served to the client computer 104 for a request using the session identifier from the plaintext data item 122.

The encoding image 124 is an image that encodes the plaintext data item 122. In some implementations, the encoding image 124 is a matrix-type barcode that represents the plaintext data item 122. One example of a suitable matrix-type barcode is a Quick Response Code (QR code). The encoding image 124 can have a pre-defined size in terms of a number of rows and columns of pixels. Each pixel in the encoding image 124 can encode a binary bit of data, where the value of each bit is represented by a different color. For example, a pixel that encodes the binary value '1' may be black while a pixel that encodes the binary value '0' may be white. In some implementations, the smallest encoding unit of an encoding image 124 may actually be larger than a single pixel. But for purposes of the examples described herein, the smallest encoding unit is assumed to be a single pixel. It should be appreciated, however, that the techniques described herein may be extended to implementations where the smallest encoding unit is a set of multiple pixels, e.g., a 2×2 or 3×3 grid of pixels.

The image generator subsystem 110 further includes a watermark image generator 114. The watermark image generator 114 is configured to process the encoding image 124 to generate a semi-transparent watermark image 126. The semi-transparent watermark image 126 is derived from the encoding image 124 and also encodes the plaintext data item 122. However, the transparencies, colors, arrangement of encoded pixels and/or other features of the watermark image 126 may be changed from the transparencies, colors, arrangement of encoded pixels and/or other features of the encoding image 124. For example, whereas the encoding image 124 may be uniformly opaque and consist of encoded pixels that are closely packed adjacent to each other, the watermark image 126 may include some fully transparent pixels and some partially transparent pixels. Moreover, the encoded pixels in the watermark image 126 may be spaced relative to each other so that each encoded pixel is surrounded by non-encoded pixels (i.e., "blank" pixels). The transformation of the encoding image 124 to the watermark image 126 may be performed so that, after the watermark image 126 is overlaid and merged on a background source image 128a, the encoded information may be recovered, e.g., by reconstructing the encoding image 124 or the watermark image 126. The details of how the watermark image generator 114 creates the watermark image 126 from the encoding image 124 are discussed more fully with respect to process 500 (FIG. 5) and FIGS. 3A-3E.

The response formatter 116 is configured to generate a response to return to the client computer 104 in reply to the client's request for an electronic document. The response can include one or more content items, including first-party content items and third-party content items, which collectively form an electronic document such as a web page, an application interface, a PDF, a presentation slide deck, or a spreadsheet. In some implementations, the response includes a primary document that specifies how various content items are to be arranged and displayed. The primary document, such as a hypertext markup language (HTML) page, may refer to first-party content items and third-party content items that are to be displayed in the presentation of the document. In some implementations, the response formatter 116 is configured to add computer code to the primary document that instructs the client computer 104, when executing the response, to display one or more instances of the watermark image 126 over the source image 128a, e.g., to add a watermark to the source image 128a that is substantially imperceptible to human users. Because the watermark image 126 has fully and partially-transparent pixels, the application at the client computer 104 that renders the electronic document can perform a blending technique to overlay the watermark image 126 on the source image 128a according to the specified transparencies of the watermark image 126. For example, the response formatter 116 may add code that directs the client computer 104 to display the source image 128a as a background image in a third-party content slot in an electronic document and to display one or more instances of the watermark image 126 as a foreground image over the source image 128a.

The server system 102 further includes an image analysis and decoder module 118. The image analysis and decoder module 118 is configured to recover an encoded representation of the plaintext data item 122 from an encoded source image 130. The encoded source image is an image that results from the client computer 104 rendering the watermark image 126 over the source image 128a. Even though the watermark image 126 is separate from the source image 128a, the encoded source image 130 processed by the image analysis and decoder module 118 may be a merged image showing the watermark image 126 blended over the source image 128a. For example, a user of the client computer 104 may receive an inappropriate or irrelevant source image 128a from one of the source image providers 106a-n in response to a request for an electronic document. The user may take a screenshot of the encoded source image 130 and transmit the screenshot to the server system 102 for analysis, e.g., to inquire about the origin of the source image 128a. Because the screenshot shows the original source image 128a overlaid by the watermark image 126, the image analysis and decoder module 118 can process the screenshot to recover an encoded representation of the plaintext data item 122, which in turn can be decoded to recover the plaintext data item 122 itself. The system 102 can then use the recovered plaintext data item 122 for various purposes, e.g., to query the response records database 120 to lookup detailed information about the source image 128a and its origins, or other information about the particular client session in which the source image 128a was served to the client computer 104. The encoded representation of the plaintext data item 122 that the image analysis and decoder module 118 generates can be, for example, a recovered watermark image 126 or a recovered encoding image 124. Additional details about the operations performed by the image analysis and decoder module 118 to recover an encoded representation of the plaintext data item 122 are described below with respect to FIG. 7.

Figure 2:
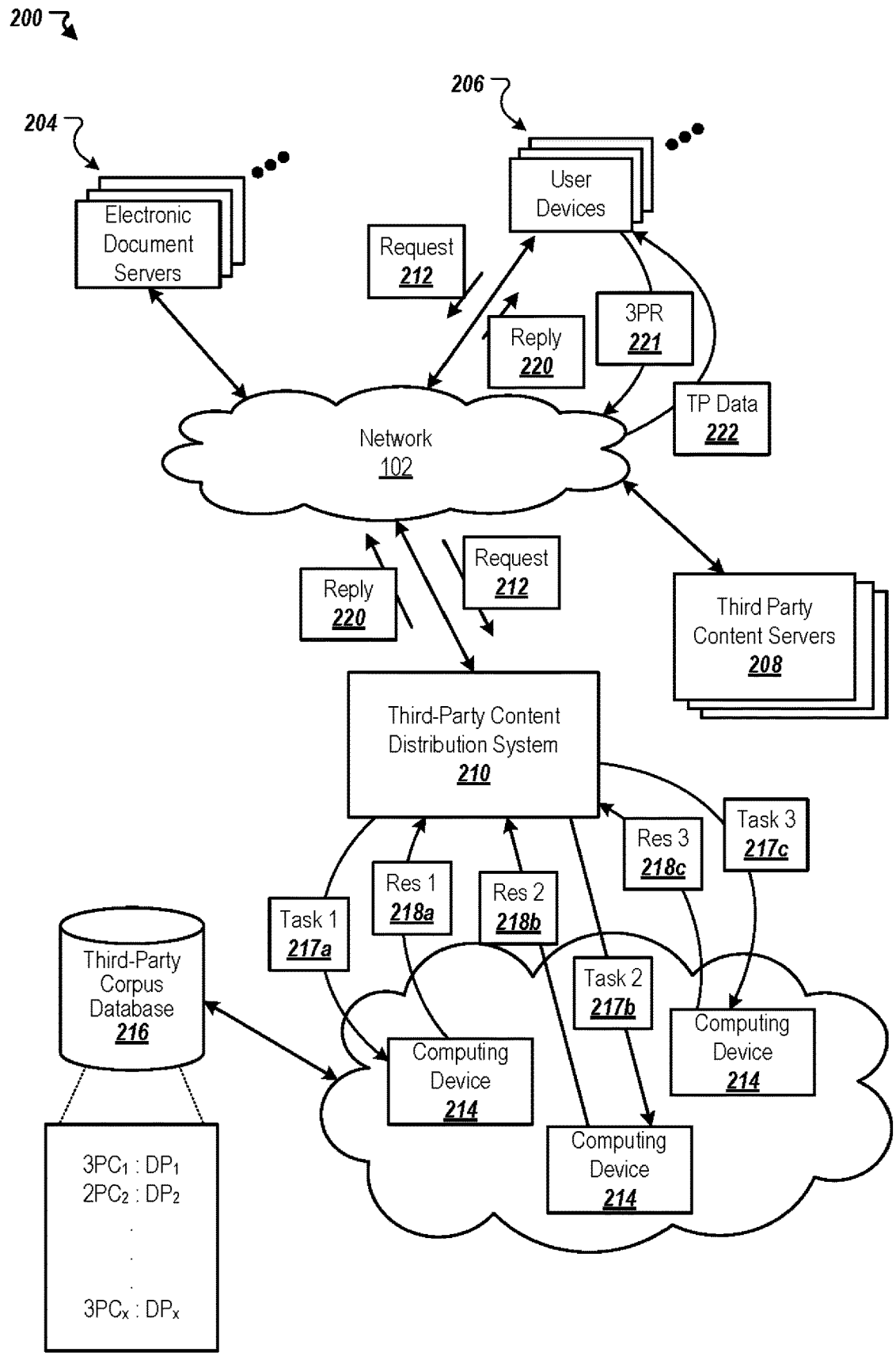
FIG. 2 is a block diagram of an example environment in which third-party content is distributed for presentation with electronic documents

FIG. 2 is a block diagram of an example environment 200 in which third-party content is distributed for presentation with electronic documents. The example environment 200 includes a network 202, such as a local area network (LAN), a wide area network (WAN), the Internet, or a combination thereof. The network 202 connects electronic document servers 204, user devices 206, third-party content servers 208, and a third-party content distribution system 210 (also referred to as a content distribution system). The example environment 200 may include many different electronic document servers 204, user devices 206 (e.g., client computers), and third-party content servers 208.

A user device 206 is an electronic device that is capable of requesting and receiving resources (e.g., electronic documents) over the network 202. Example user devices 206 include personal computers, mobile communication devices, and other devices that can send and receive data over the network 202. A user device 206 typically includes a user application, such as a web browser, to facilitate the sending and receiving of data over the network 202, but native applications executed by the user device 206 can also facilitate the sending and receiving of data over the network 202.

An electronic document is data that presents a set of content at a user device 206. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 206 by electronic document servers 204. For example, the electronic document servers 204 can include servers that host publisher websites. In this example, the user device 206 can initiate a request for a given publisher webpage, and the electronic server 204 that hosts the given publisher webpage can respond to the request by sending machine executable instructions that initiate presentation of the given webpage at the user device 206.

In another example, the electronic document servers 204 can include app servers from which user devices 206 can download apps. In this example, the user device 206 can download files required to install an app at the user device 206, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 206 to request content from the data source when the given electronic document is processed (e.g., rendered or executed) by a user device 206. The user device 206 integrates the content obtained from the data source into a presentation of the given electronic document to create a composite electronic document including the content obtained from the data source.

In some situations, a given electronic document can include a third-party tag or third-party script that references the third-party content distribution system 210. In these situations, the third-party tag or third-party script is executed by the user device 206 when the given electronic document is processed by the user device 206. Execution of the third-party tag or third-party script configures the user device 206 to generate a request for third-party content 212, which is transmitted over the network 202 to the third-party content distribution system 210. For example, the third-party tag or third-party script can enable the user device 206 to generate packetized data request including a header and payload data. The request 212 can include data such as a name (or network location) of a server from which the third-party content is being requested, a name (or network location) of the requesting device (e.g., the user device 206), and/or information that the third-party content distribution system 210 can use to select third-party content provided in response to the request. The request 212 is transmitted, by the user device 206, over the network 202 (e.g., a telecommunications network) to a server of the third-party content distribution system 210.

The request 212 can include data specifying the electronic document and characteristics of locations at which third-party content can be presented. For example, data specifying a reference (e.g., URL) to an electronic document (e.g., webpage) in which the third-party content will be presented, available locations (e.g., third-party content slots) of the electronic documents that are available to present third-party content, sizes of the available locations, positions of the available locations within a presentation of the electronic document, and/or media types that are eligible for presentation in the locations can be provided to the content distribution system 210. Similarly, data specifying keywords associated with the electronic document ("document keywords") or entities (e.g., people, places, or things) that are referenced by the electronic document can also be included in the request 212 (e.g., as payload data) and provided to the content distribution system 210 to facilitate identification of third-party content items that are eligible for presentation with the electronic document. The third-party content can be represented by one or more files (e.g., digitally stored files) that cause a perceptible (e.g., visual) instance of the third-party content to be generated by a computing device that processes the one or more files. In some implementations, the third-party content is stored in image files, text files, or other files that cause a visually perceptible instance of the third-party content to be presented by a computing device (e.g., mobile device, tablet device, wearable device). The third-party content can include any information, including images of scenery, images of text, and images that include advertising information.

Requests 212 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Data specifying characteristics of the user device 206 can also be provided in the request 212, such as information that identifies a model of the user device 206, a configuration of the user device 206, or a size (e.g., physical size or resolution) of an electronic display (e.g., touchscreen or desktop monitor) on which the electronic document is presented. Requests 212 can be transmitted, for example, over a packetized network, and the requests 212 themselves can be formatted as packetized data having a header and payload data. The header can specify a destination of the packet and the payload data can include any of the information discussed above.

The third-party content distribution system 210 selects third-party content that will be presented with the given electronic document in response to receiving the request 212 and/or using information included in the request 212. In some implementations, the third-party content is selected in less than a second to avoid errors that could be caused by delayed selection of the third-party content. For example, delays in providing third-party content in response to a request 212 can result in page load errors at the user device 206 or cause portions of the electronic document to remain unpopulated even after other portions of the electronic document are presented at the user device 206. Also, as the delay in providing third-party content to the user device 206 increases, it is more likely that the electronic document will no longer be presented at the user device 206 when the third-party content, thereby negatively impacting a user's experience with the electronic document. Further, delays in providing the third-party content can result in a failed delivery of the third-party content, for example, if the electronic document is no longer presented at the user device 206 when the third-party content is provided.

In some implementations, the third-party content distribution system 210 is implemented in a distributed computing system that includes, for example, a server and a set of multiple computing devices 214 that are interconnected and identify and distribute third-party content in response to requests 212. The set of multiple computing devices 214 operate together to identify a set of third-party content that are eligible to be presented in the electronic document from among a corpus of millions of available third-party content ($3PC_{1-x}$). The millions of available third-party content can be indexed, for example, in a third-party corpus database 216. Each third-party content index entry can reference the corresponding third-party content and/or include distribution parameters ($DP_1$-$DP_x$) (e.g. selection criteria) that condition the distribution of the corresponding third-party content.

In some implementations, the distribution parameters (e.g., selection criteria) for a particular third-party content can include distribution keywords that must be matched (e.g., by electronic documents or terms specified in the request 212) in order for the third-party content to be eligible for presentation. The distribution parameters can also require that the request 212 include information specifying a particular geographic region (e.g., country or state) and/or information specifying that the request 212 originated at a particular type of user device (e.g., mobile device or tablet device) in order for the third-party content to be eligible for presentation. The distribution parameters can also specify a bid and/or budget for distributing the particular third-party content.

The identification of the eligible third-party content can be segmented into multiple tasks 217a-217c that are then assigned among computing devices within the set of multiple computing devices 214. For example, different computing devices in the set 214 can each analyze a different portion of the third-party corpus database 216 to identify various third-party content having distribution parameters that match information included in the request 212. In some implementations, each given computing device in the set 214 can analyze a different data dimension (or set of dimensions) and pass results (Res 2-Res 3) 218a-218c of the analysis back to the third-party content distribution system 210. For example, the results 218a-218c provided by each of the computing devices in the set may identify a subset of third-party content that are eligible for distribution in response to the request and/or a subset of the third-party content that have certain distribution parameters or attributes.

The third-party content distribution system 210 aggregates the results 218a-218c received from the set of multiple computing devices 214 and uses information associated with the aggregated results to select one or more instances of third-party content that will be provided in response to the request 212. For example, the third-party content distribution system 210 can select a set of winning third-party content based on the outcome of one or more content evaluation processes, as discussed in further detail below. In turn, the third-party content distribution system 210 can generate and transmit, over the network 202, reply data 220 (e.g., digital data representing a reply) that enable the user device 206 to integrate the set of winning third-party content into the given electronic document, such that the set of winning third-party content and the content of the electronic document are presented together at a display of the user device 206.

In some implementations, the winning third-party content that is provided in response to the request 212 is a source image that will be augmented with a watermark. The system 210 may generate a watermark image and configure an electronic document to overlay the watermark image on the source image when the document is presented at a user device 206.

In some implementations, the user device 206 executes instructions included in the reply data 220, which configures and enables the user device 206 to obtain the set of winning third-party content from one or more third-party content servers. For example, the instructions in the reply data 220 can include a network location (e.g., a Uniform Resource Locator (URL)) and a script that causes the user device 206 to transmit a third-party request (3PR) 221 to the third-party content server 208 to obtain a given winning third-party content from the third-party content server 208. In response to the request, the third-party content server 208 will transmit, to the user device 206, third-party data (TP Data) 222 that causes the given winning third-party content to be incorporated to the electronic document and presented at the user device 206.

The content distribution system 210 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting.

FIGS. 3A-3I illustrate example techniques for generating a watermark image that encodes plaintext data, and for recovering an encoded representation of the plaintext data. Each of FIGS. 3A-3I is discussed in further detail below with respect to the description of processes 400-700 of FIGS. 4-7, respectively.

Figure 4:
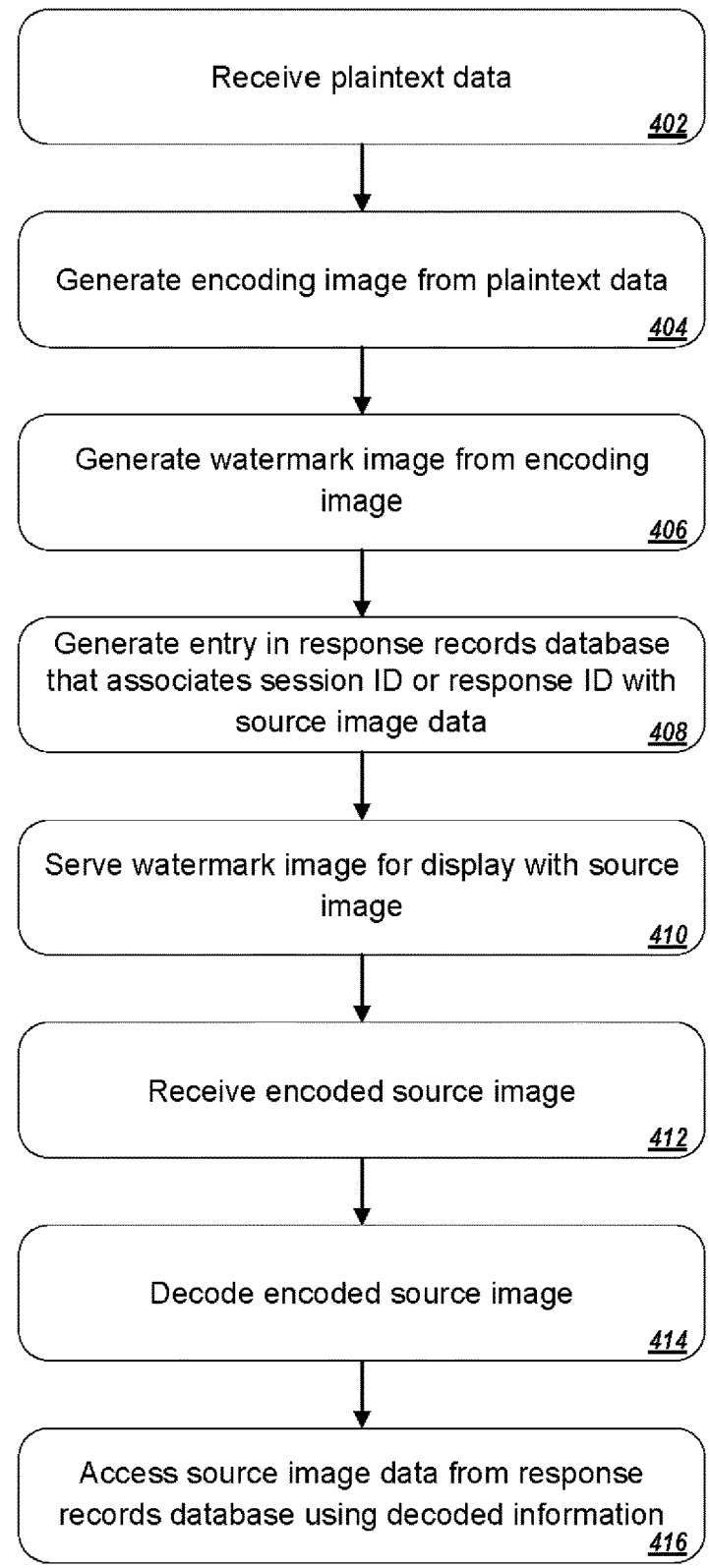
FIG. 4 is a flowchart of an example process for using semi-transparent watermark images to augment source images presented in documents served to a client computer.

FIG. 4 is a flowchart of an example process 400 for using a semi-transparent watermark image to augment a source image presented in an electronic document served to a client computer. The process 400 can be carried out by a system of one or more computers, e.g., server system 102.

In some implementations, the process 400 begins at stage 402, where the system receives plaintext data, e.g., plaintext data item 122. Plaintext data is generally any data that is capable of being encoded in an encoding image such as a QR code. In some implementations, the plaintext data is a session identifier that uniquely identifies a logical session between a client computer and the system, or that identifies an electronic document served in response to a request from a client computer. In some implementations, the plaintext data includes or references source image data that identifies a particular source image served to the client computer or information associated with the source image.

At stage 404, an encoding input generator, e.g., encoding input generator 112, of the system generates an encoding image from the plaintext data. The encoding image is an image that encodes the plaintext data. In some implementations, the encoding image is a matrix-type barcode that represents the plaintext data. One example of a suitable matrix-type barcode is a Quick Response Code (QR code). The encoding image can have a pre-defined size in terms of a number of row and columns of pixels. Each pixel in the encoding image can encode a binary bit of data, where the value of each bit is represented by a different color. For instance, a pixel that encodes the binary value '1' may be black while a pixel that encodes the binary value '0' may be white.

Figures 3A, 3B, 3C:
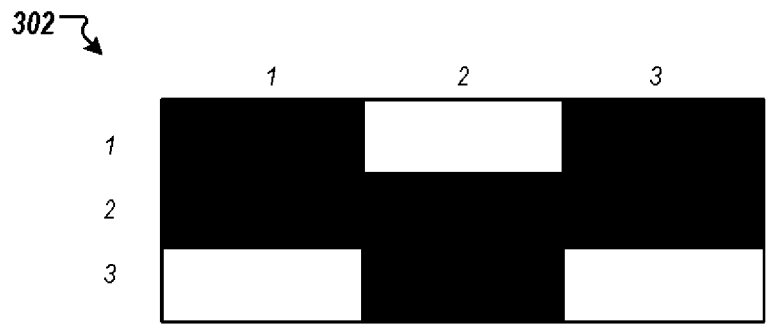

One example of an encoding image 302 is shown in FIG. 3A. The encoding image 302 in this example is a matrix-type barcode, e.g., a QR code, that has three rows of pixels and three columns of pixels. Of course, other sizes of encoding images are also possible with more or fewer rows and columns of pixels. In the encoding image 302, some pixels have a first binary color, i.e., black, and other pixels have a second binary color, i.e., white. The color of each pixel is defined by a color value. The pixels located at (row, column) coordinates (1, 2), (3, 1), and (3, 3), for example, are white, while the other pixels in encoding image 302 are black.

Additionally, each pixel may have a transparency value (also referred to as an "alpha" value) that indicates a transparency level of the pixel. The transparency value may be normalized to the range [0, 1] where a value of '0' represents fully transparent, a value of '1' represents fully non-transparent (opaque), and intermediate values between '0' and '1' represent partial transparencies. In some implementations, the encoding image 302 is fully non-transparent such that each of the pixels of the encoding image 302 has a transparency value of '1'. Image rendering applications can then use transparency values to determine composite colors for pixels that result when a foreground image is overlaid on a background image. For example, in some blending procedures, if the color value of the background pixel is 'bgRGB' and the color value of the foreground pixel is 'fgRGB' with a transparency (alpha) value of 'fgA' normalized to the range [0, 1], then the composite pixel that is ultimately rendered for display to a user will have a color value of fgRGB*fgA+bgRGB*(1−fgA). If the value of 'fgA' is zero, then the formula condenses to bgRGB*(1−fgA). FIG. 3F, for example, shows an example background image 312 (e.g., a source image), where each pixel has a color value identified by the symbol $Cn_{RGB}$.

FIG. 3G shows an encoded source image 314 that has been generated using the blending technique described in the preceding paragraph to overlay watermark image 310 (foreground image) on source image 312 (background image), where the colors of certain encoded pixels in the encoded source image 314 are a blend of partially transparent foreground pixels from the watermark image 310 and the corresponding background pixel colors from the source image 312. It should be noted that the color values and expressions shown in FIG. 3G assume that shaded pixels in the foreground watermark image are black and thus the foreground RGB value for the pixel is (0, 0, 0). Accordingly, the full expression for the composite pixel that results from blending the foreground watermark image and the background source image reduces from 'fgRGB*fgA−bgRGB*(1−fgA)' to simply 'bgRGB*(1−fgA).' Thus, if a foreground pixel from the watermark image has color (0, 0, 0) and transparency value Ba, and the color of the background pixel is $Cn_{RGB}$, then the composite color value for the pixel is defined by the expression $Cn_{RGB}*(1-Ba)$. If the foreground pixel from the watermark image has color (0, 0, 0) and transparency value 0, and the color of the background pixel is $Cn_{RGB}$, then the composite color value for the pixel is $Cn_{RGB}$.

At stage 406, a watermark image generator, e.g., watermark image generator 114, of the system generates a watermark image. The watermark image is a semi-transparent image that includes pixels having two or more different levels of transparency to encode the plaintext data item. For bi-level transparency, the watermark image may consist of a first set of pixels having a first transparency level, e.g., partially transparent, and a second set of pixels having a second transparency level, e.g., fully transparent. The first set of pixels may be encoded pixels that each represents a respective pixel from the encoding image having a first color value such as black. The second set of pixels may include two subsets of pixels, namely encoded pixels and blank pixels. Although the encoded and blank pixels in the second subset may share the same transparency level, only the encoded subset of pixels represents pixels from the encoding image having a second color value, such as white. The blank pixels do not represent any pixels from the encoding image, but are instead interspersed among the encoded pixels of the first and second sets of pixels to facilitate recovery of information from an encoded source image that may later result from the watermark image being overlaid on a background image.

Figure 5:
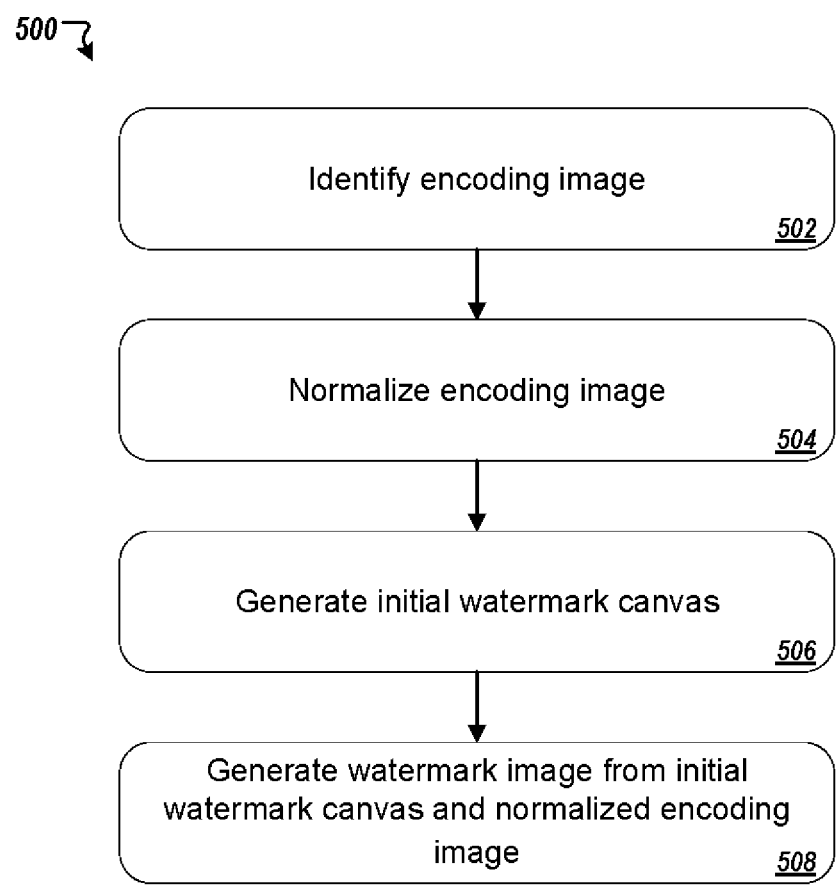
FIG. 5 is a flowchart of an example process for generating a watermark image from an encoding image.

In some implementations, the system carries out stage 404 according to the example process 500 depicted in the flowchart of FIG. 5. The process 500 is a process for generating a watermark image from an encoding image. The process 500 can be performed by a system of one or more computers, e.g., server system 102, and specifically by a watermark image generator, e.g., watermark image generator 114.

At stage 502, the watermark image generator identifies an encoding image such as encoding image 302.

Optionally, at stage 504, the watermark image generator normalizes the encoding image. Normalizing the encoding image can involve mapping the respective color values and transparency values of all or some of the pixels in the encoding image to pre-defined color and/or transparency values. For example, if in the original encoding image, binary values encoded in the image were distinguished by pixel color, then in the normalized encoding image, binary values encoded in the normalized image may be distinguished by pixel transparency.

FIGS. 3B and 3C depict one example of normalizing an encoding image. In particular, FIG. 3B shows an example representation 304 of the original encoding image 302 in which the black pixels all have the color value $B_{RGB}$ and have the transparency value $B_A$ and the white pixels all have the color value $W_{RGB}$ and have the transparency value $W_A$. In some implementations, $W_A$ and $B_A$ are identical. FIG. 3C shows a normalized encoding image 306 where the colors and transparencies of the pixels have been transformed so that the black and white pixels are assigned the common color $B_{RGB}$ but are differentiated by their transparencies. The black pixels are assigned the transparency value $B_A$, while the white pixels are assigned the transparency value of '0', i.e., fully transparent.

Referring again to FIG. 5, at stage 506, the watermark image generator generates an initial watermark canvas. In some implementations, the initial watermark canvas is a preliminary image that has a pre-defined size and provides a starting point for creation of a watermark image. An example initial watermark canvas is canvas 308, as shown in FIG. 3D. The canvas 308 has the same number of rows as the normalized encoding image 306, but is made to have twice the number of columns as the normalized encoding image 306. Additionally, all the pixels in the initial watermark canvas 308 are blank pixels that have the same color and transparency level. Blank pixels are pixels that do not encode information from the encoding image and do not correspond to any pixels in the encoding image. In some implementations, blank pixels have the same transparency as the second set of pixels in the normalized encoding image 306. For example, the blank pixels in canvas 308 are fully transparent as indicated by the latter value in the respective parentheticals (color value, transparency value) for each pixel.

At stage 508, the watermark image generator uses the normalized encoding image to add encoded pixels to the initial watermark canvas to create a final watermark image. Encoded pixels are pixels in the watermark image which, in contrast to blank pixels, do encode information from the encoding image. Each encoded pixel in the watermark image corresponds to one of the pixels in the normalized encoding image. In some implementations, the final watermark image is generated by replacing blank pixels in the initial watermark canvas with encoded pixels from the normalized encoding image. For example, a given blank pixel in the initial watermark canvas may be fully transparent. If that pixel is made to be an encoded pixel, then that pixel is assigned the transparency of a corresponding pixel from the normalized encoding image. In some cases, the pixel may remain fully transparent if the corresponding pixel from the normalized encoding image is fully transparent. In other cases, the transparency of the watermark pixel may be adjusted to be partially transparent if the corresponding pixel from the normalized encoding image is partially transparent.

FIG. 3E shows one example of a watermark image 310 that the watermark image generator generates from the initial watermark canvas 308 based on the normalized encoding image 306. Each of the pixels in the watermark image 310 that have a patterned background represents an encoded pixel. Each of the pixels in the watermark image 310 having a non-patterned white background represents a blank pixel. As the watermark image 310 shows, the encoded pixels are distributed among the blank pixels such that each encoded pixel is neighbored at the top, bottom, left, and/or right by at least two blank pixels. In general, the watermark image generator distributes encoded pixels in the watermark image so that each encoded pixel is directly adjacent to at least one, two, three, four, or more blank pixels. This arrangement can allow encoded information to later be recovered from a source image that has been augmented by a watermark image without a priori knowledge of the source image, as described further below. In the example of FIG. 3E, the watermark image generator has interspersed the encoded pixels in the watermark image by starting with the arrangement of pixels in the normalized encoding image, inserting a blank pixel directly to the right of each encoded pixel in odd-numbered rows, and inserting a blank pixel directly to the left of each encoded pixel in even-numbered rows so as to shift the encoded pixels in even-numbered rows by one pixel relative to the encoded pixels in odd-numbered rows. The effect is to stagger the encoded pixels and to surround them by blank pixels, as shown in the final watermark image 310. Thus, in the final watermark image 310, the only pixels that are not fully transparent are the encoded pixels that correspond to black pixels in the original encoding image 302. More generally, encoded pixels in the watermark image 310 that correspond to pixels of a first binary color in the original encoding image 302 may be assigned a first transparency level, whereas a different, second transparency level may be assigned to both blank pixels and encoded pixels that correspond to pixels of a second binary color from the original encoding image 302.

In some implementations, the watermark image generator can use other techniques for mapping encoded pixels from the normalized encoding image 306 to the final watermark image 310. The watermark image generator may use a mapping template that correlates positions for encoded pixels in the watermark image 310 to pixel positions in the normalized encoding image 306. Every pixel in the normalized encoding image 306 can be mapped to a pixel in the watermark image 310. In some implementations, the system can also use the mapping template to perform a reverse mapping of encoded pixels from an encoded source image in order to reconstruct the watermark image 310 or the encoding image 302 from the encoded source image. The mapping template can identify any arrangement of encoding pixels (e.g., in any order) in the watermark image 310, so long as each of the encoding pixels directly neighbors one or more blank pixels.

Referring back to FIG. 4, at stage 408, the system generates an entry in a response records database, e.g., response records database 120. The response records database contains a log that stores information about each response or other electronic document (e.g., a pushed electronic document that is not responsive to a specific request) transmitted to one or more client computers in communication with the server system over a period of time. Each response may be associated with a client session, which may entail one or more request-response interactions between a given client computer and the server system. In some implementations, a given entry in the response records database includes a session ID, a response ID, and source image data. The session ID uniquely identifies a server-client network session, the response ID uniquely identifies a response served to the client computer during a given session, and the source image data identifies information about a source image transmitted to the client computer for a particular session or response. The session ID, response ID, or both may form the plaintext data that is encoded in the encoding image and watermark image so that the system can later use a watermark overlaid on a source image to recover the session ID, response ID, or both, and to lookup the appropriate source image data associated with the session ID and/or response ID.

Figure 6:
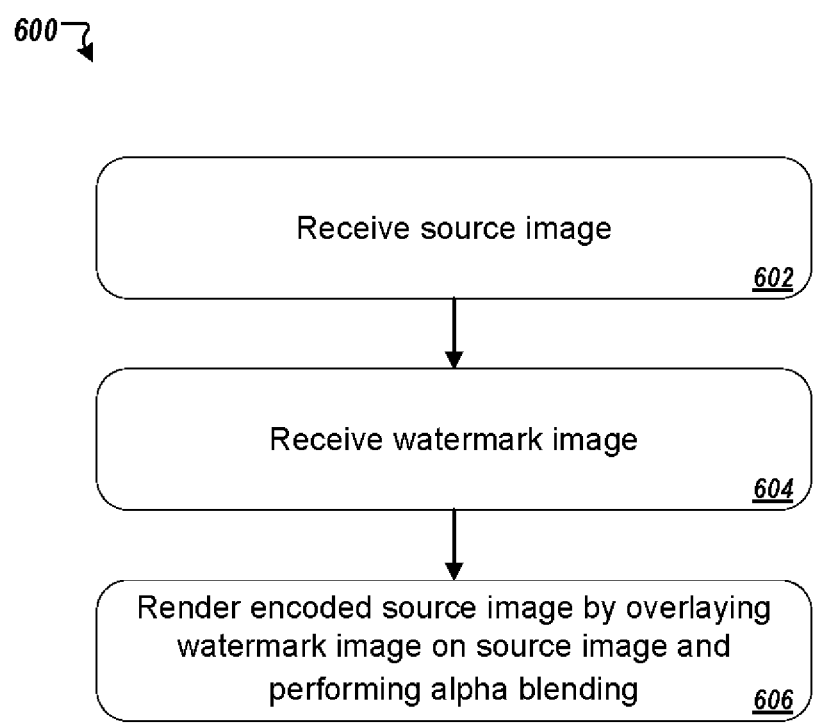
FIG. 6 is a flowchart of an example process for rendering an encoded source image using a source image and a watermark image.

At stage 410, the server system serves an electronic document to the client computer. The electronic document may include computer code that, when executed by the client computer, causes the client computer to request and obtain the source image and the watermark image. Further, the computer code may include instructions for the client computer to overlay the watermark image on the source image when the electronic document is rendered for presentation to a user. For example, an example process 600 for rendering an encoded source image at a client computer is depicted in FIG. 6. The process 600 can be carried out by one or more computing devices, e.g., client computer 104. In some implementations, the process 600 is carried out by an application installed on the client computer, such as a web browsing application.

At stage 602, the client computer receives a source image from the server system or another computing system. At stage 604, the client computer receives a watermark image from the server system, along with an electronic document that contains instructions for the watermark image to be displayed in the foreground over the source image. At stage 606, the client computer renders the electronic document, including displaying the watermark image over the source image. The resulting image that is displayed when the watermark is overlaid on the source image is referred to as an encoded source image. In some implementations, the client computer uses a blending technique to shade pixels in the source image that are covered by partially transparent pixels in the watermark image. The blending technique can involve, for example, for each pixel in the watermark image that overlays a pixel in the background source image, determining a composite/blended color to display by weighting the color of the watermark image pixel relative to the color of the background source image pixel using a transparency value assigned to the watermark image pixel. In some implementations, the watermark image is smaller than the source image in that it has fewer rows and/or columns of pixels than the source image. In order to watermark the entire source image, the client computer may tile multiple instances of the watermark image over the source image. By way of example, FIG. 3H shows an example source image 316. FIG. 3I shows an example watermark image 318 based on the QR code 302. FIG. 3J shows an encoded source image 320 in which the watermark image 318 has been tiled multiple times over the source image 316.

Figure 7:
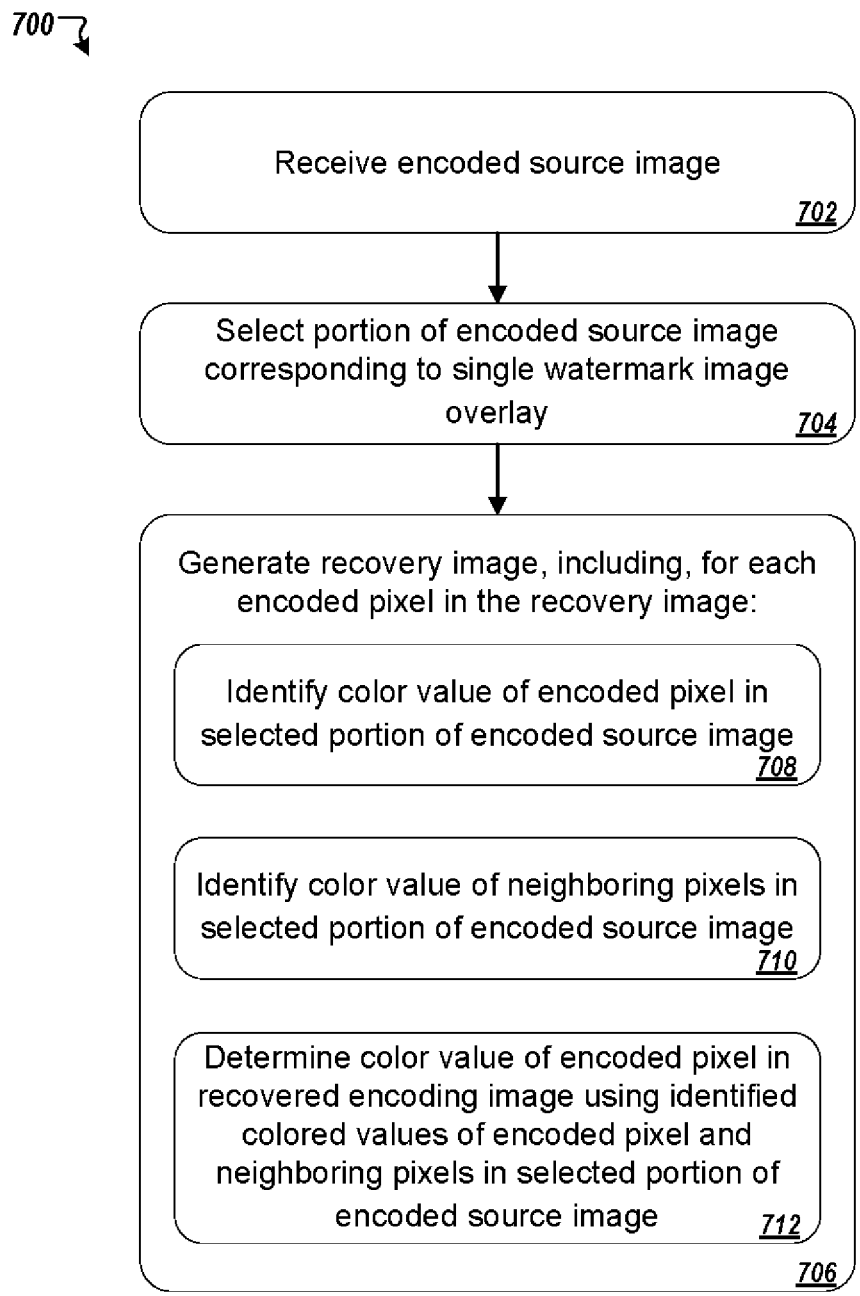
FIG. 7 is a flowchart of an example process for generating a recovery image from an encoded source image.

At stage 412, after serving the electronic document and watermark image to the client computer, the server system later receives an encoded source image that was rendered at the client computer. At stage 414, a decoder module of the server system, e.g., image analysis and decoder module 118, processes the encoded source image to recover an encoded representation of the plaintext data. In some implementations, the decoding involves generating a recovery image from the encoded source image. The recovery image may be, for example, the watermark image, the encoding image, the normalized encoding image, or another image from which the plaintext data can be read. An example process 700 for generating a recovery image from an encoded source image is depicted in FIG. 7. The process 700 can be carried out by a system of one or more computers, e.g., image analysis and decoder module 118 of server system 102.

At stage 702, the decoder module receives an encoded source image. For example, a user of the client computer may be presented an inappropriate or irrelevant source image in an electronic document. The user may take a screenshot of the encoded source image and transmit the screenshot to the server system for analysis, e.g., to inquire about the origin of the source image.

In some instances, the client computer may have tiled multiple copies of the watermark image over the source image to render the encoded source image. The decoder module may only require a portion of the encoded source image that corresponds to a single, overlaid watermark image. Accordingly, at stage 704, the decoder module selects such a portion of the encoded source image that corresponds to a single, overlaid watermark image. The server system may know the size/dimensions of the watermark image and selects a portion of the encoded source image that matches the known size. In some implementations, the server system selects a portion of the encoded source image that is known to correspond to one full instance of the watermark image, e.g., a portion that extends down and to the right from the top left corner of the encoded source image. In other implementations, the server system may "hunt" for an appropriate portion of the encoded source image that encompasses a single, but entire watermark image that has been overlaid in the encoded source image. For example, the decoder module may select a portion at an arbitrary location, generate a recovery image based on the selected portion, and then verify whether the recovery image encodes valid plaintext data. If the recovery image does not encode valid plaintext data, then the decoder module selects another portion at a different location of the encoded source image, generates a recovery image based on the newly selected portion, and verifies whether the recovery image encodes valid plaintext data. The decoder module may continue searching until a portion is selected that yields valid plaintext data when decoded.

At stage 706, the decoder module generates a recovery image using the selected portion of the encoded source image. Generating a recovery image can involve performing the operations represented in stages 708-712 for each encoded pixel in the selected portion of the encoded source image. The encoded source image can include both encoded pixels and blank pixels. Encoded pixels carry encoded information and correspond to encoded pixels in the watermark image. Blank pixels do not carry encoded information and correspond to blank pixels in the watermark image. The decoder module uses a mapping template that identifies an arrangement of encoded pixels in a watermark image to distinguish encoded pixels from blank pixels.

Because the encoded source image is created by overlaying a partially transparent watermark image over the original source image, the color of each pixel in the selected portion of the encoded source image is based on the color of a background pixel from the original source image, the color of a foreground pixel from the watermark image, and the transparency level of the foreground pixel in the watermark image. In some implementations, the transparency levels of the blank pixels and a portion of the encoded pixels in the overlaid watermark image that correspond to a second binary value (e.g., pixels representing white pixels in the original encoding image) may be '0', i.e., fully transparent. The transparency levels of the remaining encoded pixels in the watermark image that correspond to a first binary value (e.g., pixels representing black pixels in the original encoding image) may be slightly greater than zero so as to slightly darken (e.g., by a user-imperceptible amount) the color of the respective background source image pixels when the watermark image is overlaid on the source image. Under these or similar conditions, and by applying the assumption that the color of any given pixel in the source image matches the color of its neighboring pixels within a specified tolerance, the decoder module can generate a recovery image by determining the encoded value of each encoded pixel in the selected portion of the encoded source image according to operations 708-712.

In particular, at stage 708, the decoder module identifies a color value that indicates the color of a given encoded pixel in the selected portion of the encoded source image. At stage 710, the decoder module identifies the respective color values of the blank pixels that neighbor the given encoded pixel. A neighboring pixel is generally any pixel that is adjacent to the encoded pixel, e.g., directly above, below, or to the left or right of the encoded pixel.

At stage 712, the decoder module decodes the given encoded pixel in the selected portion of the encoded source image using the identified color values of the encoded pixel and its neighboring pixels. Because the color value of each pixel in the source image is assumed to match the color value of its neighboring pixels within a specified tolerance, a decoded value of the encoded pixel can be determined by comparing the color value of the encoded pixel to the color values of one or more of its neighboring pixels. If the color value of the encoded pixel matches the color values of the neighboring pixels within the specified tolerance, then the encoded pixel is assumed not to have been darkened by a semi-transparent pixel in the overlaid watermark image, and the encoded pixel is decoded to represent a second binary value (e.g., a value that represents a 'white' pixel in the original encoding image). If the color value of the encoded pixel does not match the color values of the neighboring pixels within the specified tolerance, then the encoded pixel is considered to have been darkened by a semi-transparent pixel in the overlaid watermark image, and the encoded pixel is decoded to represent a first binary value (e.g., a value that represents a 'black' pixel in the original encoding image). Alternatively the decoder module may multiply the color values of the neighboring pixels from the encoded source image by $(1-B_a)$, where $B_a$ is the normalized transparency value that was assigned to encoded pixels having the first binary value (e.g., 'black' pixels) in the watermark image and where $B_{RGB}$ is represented by the value (0, 0, 0). If the resulting color values of the neighboring pixels after multiplication by $(1-B_a)$ matches the color value of the encoded pixel within the specified tolerance, then the encoded pixel is decoded to represent the first binary value (e.g., a value that represents a 'black' pixel in the original encoding image), because the match indicates that the encoded pixel was also darkened by $(1-B_a)$ during the blending process. As another alternative, the colors of the encoded pixel and its neighboring pixels may be provided as inputs to a machine-learning model that has been trained to classify encoded pixels as either encoding the first or second binary value based on the color of the encoded pixel and its neighboring pixels. In some instances, if the encoded pixel does not meet the matching criteria to be decoded to either the first or second binary value, the decoder module may arbitrarily assign either the first or second binary decoded value to that pixel.

During stage 712, the decoder module may employ various techniques to determine a decoded value for a given encoded pixel from the encoded source image. In some implementations, the decoder module uses a matching technique that involves determining a match with the color values of a majority of neighboring pixels. If the colors of a majority of the neighboring pixels of an encoding pixel match the color of the encoding pixel within a specified tolerance, then the encoded pixel is decoded to represent the second binary value (e.g., a value that represents a 'white' pixel in the original encoding image). If the colors of a majority of the neighboring pixels after multiplication by $(1-B_a)$ match the color of the encoding pixel within the specified tolerance, then the encoded pixel is decoded to represent the first binary value (e.g., a value that represents a 'black' pixel in the original encoding image). If no match is determined for either the first or second binary value, then an encoding pixel can be arbitrarily decoded to either the first or second binary value. In other implementations, the decoder module uses a matching technique that involves determining an average color value among the neighboring pixels and comparing the averaged color value of the neighboring pixels to the color value of the target encoding pixel. The specified tolerance may be, for example, 0, 1, 2, 3, 4, or 5 percent, for example. When the tolerance is 0 percent, the decoder module may require an exact match in color values between the encoded pixel and neighboring pixels.

The decoder module repeats operations 708-712 to decode each of the encoded pixels in the selected portion of the encoded source image, and can further use an appropriate mapping template to generate a recovery image such as a watermark image or a reconstruction of the original encoding image based on the decoded values of the pixels. In some implementations, the decoder module repeats stages 704 and 706 for each of multiple selected portions of the encoded source image and combines the decoding results from each selected portion. Each selected portion corresponds to a different instance of the watermark image overlaid on the source image, thereby adding redundancy and, potentially, reliability to the decoding results.

Finally, referring back to FIG. 4, at stage 416 the server system uses the decoding information to recover plaintext data. The system uses the plaintext data for various purposes. In some implementations, the plaintext data represents a session ID or a response ID. The server system can query the response records database using the session ID or response ID to lookup source image data and determine, for example, a particular content provider that provided the source image.

Figure 8:
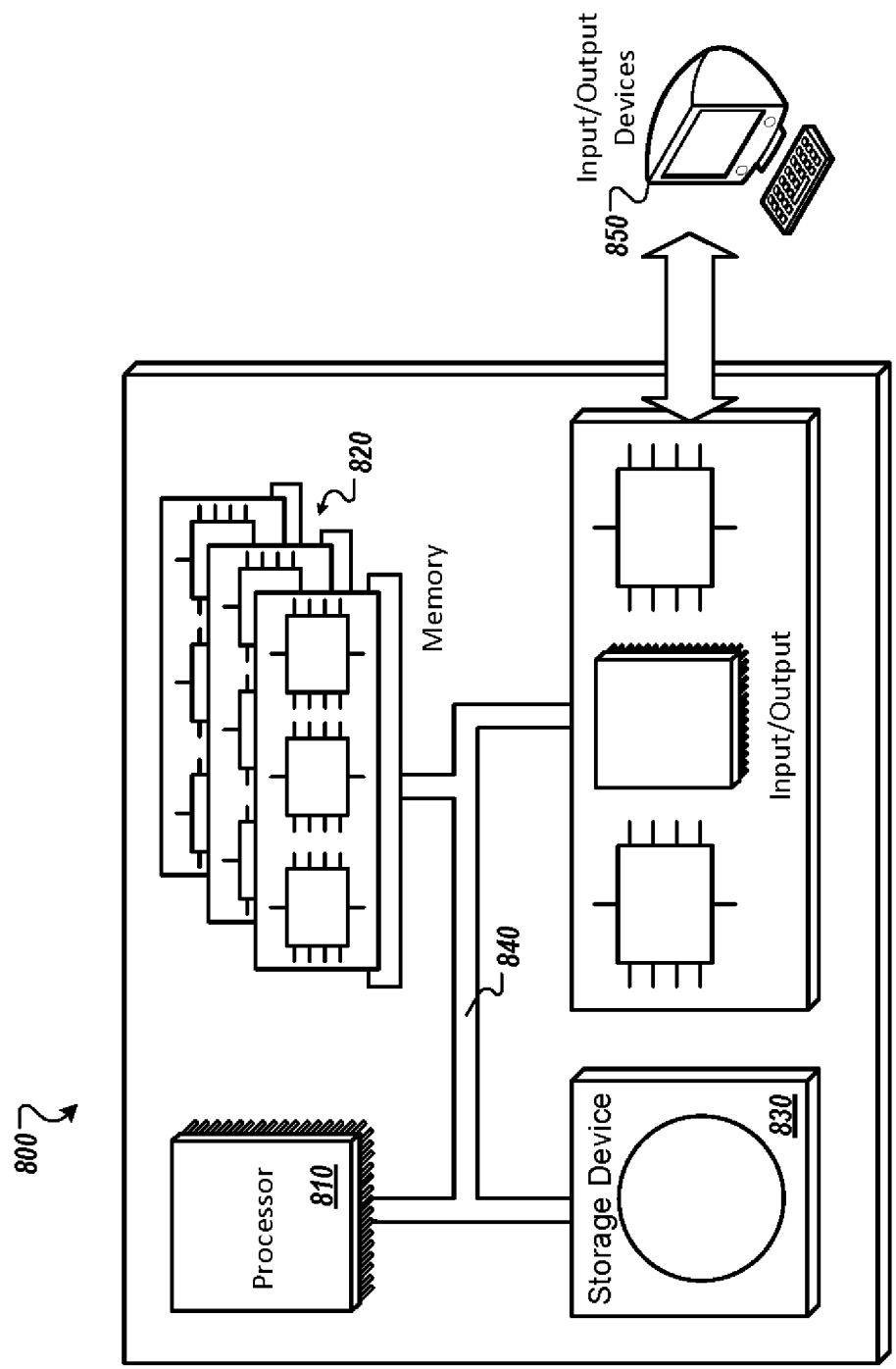
FIG. 8 is a schematic diagram of a computer system that can be used to carry out the operations described in association with the computer-implemented methods, systems, devices, and other techniques described herein.

FIG. 8 is a schematic diagram of a computer system 800. The system 800 can be used to carry out the operations described in association with any of the computer-implemented methods, systems, devices, and other techniques described previously, according to some implementations. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In some implementations, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 400. In one implementation, the storage device 830 is a computer-readable medium. In various different implementations, the storage device 830 may be a floppy disk device, a hard disk device, an optical disk device, or a tape device.

The input/output device 840 provides input/output operations for the system 400. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    receiving, by a first system of one or more computers and from a client device, a request for an electronic document;
    obtaining, by the first system, a watermark image (i) corresponding to a source image for display at the client device and (ii) comprising a set of encoded pixels distributed among a set of blank pixels of the watermark image such that each encoded pixel neighbors one or more blank pixels in the watermark image, wherein the encoded pixels encode a data item comprising information about a source of the source image;
    sending, by the first system and to the client device, (i) the electronic document, (ii) the watermark image, and (iii) data that instructs the client device to render the watermark image over a particular location within the electronic document at which the source image is designated to be displayed upon receipt of the source image from a second system different from the first system;
    receiving, by the first system and from the client device, an encoded source image generated by blending the watermark image with the source image at the client device;
    decoding, by the first system, the data item from the encoded source image; and
    identifying, by the first system, the source of the source image from the decoded data item.

2. The method of claim 1, wherein each encoded pixel encodes a portion of the data item and decoding the data item comprises, for each encoded pixel in the set of encoded pixels, decoding a value of the encoded pixel by comparing a color of the encoded pixel to a color of each of the one or more blank pixels that neighbor the encoded pixel.

3. The method of claim 1, wherein the watermark image comprises a semi-transparent watermark image containing an initial set of encoded pixels and an initial set of non-encoded pixels.

4. The method of claim 3, wherein:
    the initial set of encoded pixels in the semi-transparent watermark image each encodes one of a first value or a second value;
    pixels from the initial set of encoded pixels that are encoded with the first value are assigned a first transparency value;
    pixels from the initial set of encoded pixels that are encoded with the second value are assigned a second transparency value; and
    pixels from the initial set of non-encoded pixels are assigned the second transparency value.

5. The method of claim 4, wherein:
    pixels from the initial set of encoded pixels that are encoded with the first value are colored a first color; and
    pixels from the initial set of encoded pixels that are encoded with the second value are colored a second color.

6. The method of claim 1, wherein the data item comprises a session identifier that identifies a session between the client device and the system, the method comprising identifying the session identifier from the decoded data item.

7. The method of claim 1, wherein the data item comprises information indicating characteristics of the source image, the method comprising identifying the characteristics of the source image from the decoded data item.

8. The method of claim 1, wherein the data item comprises information identifying an electronic document provided to the client device in response to an additional request from the client device, the method comprising identifying the electronic document from the decoded data item.

9. A system, comprising:
one or more computers of a first system; and
one or more computer-readable media having instructions stored thereon that, when executed by the one or more computers, cause the one or more computers to perform operations comprising:
receiving, from a client device, a request for an electronic document;
obtaining a watermark image (i) corresponding to a source image for display at the client device and (ii) comprising a set of encoded pixels distributed among a set of blank pixels of the watermark image such that each encoded pixel neighbors one or more blank pixels in the watermark image, wherein the encoded pixels encode a data item comprising information about a source of the source image;
sending, to the client device, (i) the electronic document, (ii) the watermark image, and (iii) data that instructs the client device to render the watermark image over a particular location within the electronic document at which the source image is designated to be displayed upon receipt of the source image from a second system different from the first system;
receiving, from the client device, an encoded source image generated by blending the watermark image with the source image at the client device;
decoding the data item from the encoded source image; and
identifying the source of the source image from the decoded data item.

10. The system of claim 9, wherein each encoded pixel encodes a portion of the data item and decoding the data item comprises, for each encoded pixel in the set of encoded pixels, decoding a value of the encoded pixel by comparing a color of the encoded pixel to a color of each of the one or more blank pixels that neighbor the encoded pixel.

11. The system of claim 9, wherein the watermark image comprises a semi-transparent watermark image containing an initial set of encoded pixels and an initial set of non-encoded pixels.

12. The system of claim 11, wherein:
the initial set of encoded pixels in the semi-transparent watermark image each encodes one of a first value or a second value;
pixels from the initial set of encoded pixels that are encoded with the first value are assigned a first transparency value;
pixels from the initial set of encoded pixels that are encoded with the second value are assigned a second transparency value; and
pixels from the initial set of non-encoded pixels are assigned the second transparency value.

13. The system of claim 12, wherein:
pixels from the initial set of encoded pixels that are encoded with the first value are colored a first color; and
pixels from the initial set of encoded pixels that are encoded with the second value are colored a second color.

14. The system of claim 9, wherein the data item comprises a session identifier that identifies a session between the client device and the system, the operations comprising identifying the session identifier from the decoded data item.

15. The system of claim 9, wherein the data item comprises information indicating characteristics of the source image, the operations comprising identifying the characteristics of the source image from the decoded data item.

16. The system of claim 9, wherein the data item comprises information identifying an electronic document provided to the client device in response to an additional request from the client device, the operations comprising identifying the electronic document from the decoded data item.

17. One or more non-transitory computer-readable media having instructions stored thereon that, when executed by one or more processors of a first system, cause the one or more processors to perform operations comprising:
receiving, from a client device, a request for an electronic document;
obtaining a watermark image (i) corresponding to a source image for display at the client device and (ii) comprising a set of encoded pixels distributed among a set of blank pixels of the watermark image such that each encoded pixel neighbors one or more blank pixels in the watermark image, wherein the encoded pixels encode a data item comprising information about a source of the source image;
sending, to the client device, (i) the electronic document, (ii) the watermark image, and (iii) data that instructs the client device to render the watermark image over a particular location within the electronic document at which the source image is designated to be displayed upon receipt of the source image from a second system different from the first system;
receiving, from the client device, an encoded source image generated by blending the watermark image with the source image at the client device;
decoding the data item from the encoded source image; and
identifying the source of the source image from the decoded data item.

18. The one or more non-transitory computer-readable media of claim 17, wherein the data item comprises a session identifier that identifies a session between the client device and the system, the operations comprising identifying the session identifier from the decoded data item.

19. The one or more non-transitory computer-readable media of claim 17, wherein the data item comprises information indicating characteristics of the source image, the operations comprising identifying the characteristics of the source image from the decoded data item.

20. The one or more non-transitory computer-readable media of claim 17, wherein the data item comprises information identifying an electronic document provided to the client device in response to an additional request from the client device, the operations comprising identifying the electronic document from the decoded data item.

* * * * *